(12) United States Patent
Legall

(10) Patent No.: US 11,892,029 B2
(45) Date of Patent: Feb. 6, 2024

(54) CLIP FOR HOLDING TWO FLAT ELEMENTS, ASSEMBLY COMPRISING SUCH A CLIP

(71) Applicant: A. RAYMOND ET CIE, Grenoble (FR)

(72) Inventor: Antoine Legall, Fontaine (FR)

(73) Assignee: A. RAYMOND ET CIE, Grenoble (FR)

( * ) Notice: Subject to any disclaimer, the term of this patent is extended or adjusted under 35 U.S.C. 154(b) by 225 days.

(21) Appl. No.: 17/644,734

(22) Filed: Dec. 16, 2021

(65) Prior Publication Data

US 2022/0196050 A1 Jun. 23, 2022

(30) Foreign Application Priority Data

Dec. 17, 2020 (FR) ..................................... 2013553

(51) Int. Cl.
*F16B 5/06* (2006.01)
*F24S 25/632* (2018.01)
*F24S 25/634* (2018.01)

(52) U.S. Cl.
CPC .......... *F16B 5/0635* (2013.01); *F24S 25/632* (2018.05); *F24S 25/634* (2018.05)

(58) Field of Classification Search
CPC ..... F16B 5/0635; F24S 25/632; F24S 25/634; F24S 2025/6004; H02S 20/23; F24J 2/5256; F24J 2002/4665
See application file for complete search history.

(56) References Cited

U.S. PATENT DOCUMENTS

| 3,126,182 | A  | * | 3/1964  | Stamper ................... F16L 3/24 248/72 |
| RE26,247  | E  | * | 8/1967  | Tinnerman ................ F16L 3/24 248/71 |
| 7,614,590 | B2 | * | 11/2009 | Boville ................... F16B 2/245 248/228.2 |

(Continued)

FOREIGN PATENT DOCUMENTS

WO 2018/024951 A1 2/2018

OTHER PUBLICATIONS

European Extended Search Report and Opinion for European Application No. 21209409, dated May 19, 2022, 5 pages.

*Primary Examiner* — Robert Sandy
*Assistant Examiner* — Rowland Do
(74) *Attorney, Agent, or Firm* — TraskBritt

(57) ABSTRACT

A clip for holding two flat elements joined together at their main face. The clip comprises a lower wall, an upper wall, and two side walls, the walls defining a closed volume. The side walls are provided with a groove having an end that opens into a face referred to as the "front face" of the clip. The grooves are configured to insert the clip by its front face onto the two joined flat elements and are each delimited by a contour having an upper segment and a lower segment opposite the upper segment. According to the present disclosure, the side walls each have, on their respective outwardly facing faces, a flat holding flange that extends along a rectilinear portion of the lower segment of the groove and provides a contact surface with one of the flat elements. The present disclosure also relates to an assembly comprising such a clip.

13 Claims, 3 Drawing Sheets

(56) References Cited

U.S. PATENT DOCUMENTS

| | | | |
|---|---|---|---|
| 8,534,625 B2* | 9/2013 | Heath | F16B 2/06 |
| | | | 248/65 |
| 9,331,629 B2* | 5/2016 | Cheung | F24S 25/634 |
| 10,100,973 B2* | 10/2018 | Anderson | F16M 13/02 |
| 10,211,774 B2* | 2/2019 | Zhu | H02S 30/10 |
| 10,801,538 B2 | 10/2020 | Legall et al. | |
| 11,552,590 B2* | 1/2023 | Cavieres Pinilla | F16B 2/243 |
| 2013/0102165 A1 | 4/2013 | Dupont | |
| 2019/0312546 A1 | 10/2019 | Legall et al. | |

* cited by examiner

CLIP FOR HOLDING TWO FLAT ELEMENTS, ASSEMBLY COMPRISING SUCH A CLIP

PRIORITY CLAIM

This application claims the benefit of the filing date of French Patent Application Serial No. FR2013553, filed Dec. 17, 2020, for "CLIP FOR HOLDING TWO FLAT ELEMENTS, ASSEMBLY COMPRISING SUCH A CLIP," the disclosure of which is incorporated herein in its entirety by this reference.

TECHNICAL FIELD

The present disclosure relates to a clip for holding two flat elements. It is particularly used to secure the frame of a photovoltaic module on a rail of a supporting structure.

BACKGROUND

Metal clips are known from document EP3494315 for holding flat elements assembled to one another at their main faces. These clips find a very particular application for assembling the frame of a photovoltaic panel to a rail of a supporting frame.

The clips proposed by this document are formed from a metal strip cut and bent at right angles to define a straight block having two side walls, a lower wall and an upper wall. The ends of the metal strip are connected to one another on the side of the lower wall of the clip, and these ends have a bend allowing them to be brought into abutment against one another. One of these ends may also have a blocking tab preventing the sliding of the abutting surfaces, in particular, when the clip is subjected to strong stresses that would tend to deform it.

The side walls are each provided with grooves, one end of which opens into a front face of the clip. The clip can be inserted on the two flat elements assembled together to engage them in the grooves, which makes it possible to keep the two flat elements assembled against one another.

By inserting a plurality of such clips along the rails of the carrier frame, engaged on the frame of a photovoltaic panel, this panel is securely held to the frame. These clips are, however, subjected to strong stresses, in particular, when forces tending to separate the panel from the rail are applied, for example, forces exerted by the wind on one of the faces of the panel.

This is all the more true since, in order to make photovoltaic installations as inexpensive as possible, the trend is toward increasing panel sizes, which increases their exposure to the wind. This leads to increasing the maximum tearing force that a clip must necessarily hold. At the same time, and with the same concern for savings, the sheets from which the rails of the supporting frames are made are chosen to have a thickness that tends to be reduced. The rails are therefore liable to deform, depending on the intensity and the nature of the forces transmitted by the panels that they support, in particular, in bending or in torsion along their longitudinal axis.

It was thus observed that in certain cases, this deformation in bending and/or in torsion of the rail could lead to deforming the clip, by sliding the one against another of the end bends closing the metal strip on the side of the bottom wall of the clip, and despite the presence of blocking tabs. The clip thus deformed in torsion is no longer able to keep the rail and the frame of the panel assembled to one another, which of course is not desirable and which can create a serious safety problem.

BRIEF SUMMARY

It is an object of the present disclosure to address this problem at least in part. More precisely, an object of the present disclosure is to provide a clip that is more robust than that of the state of the art, that is to say, which is capable of withstanding significant forces transmitted by the flat elements that it keeps joined, in particular, when at least one of these flat elements is liable to deform in torsion or in bending under the effect of significant external forces.

With a view to achieving this aim, the object of the present disclosure provides a clip for holding two flat elements joined together at their main face, the clip comprising a lower wall, an upper wall, and two side walls. The walls are interconnected to define a closed volume. The two side walls are each provided with a groove having an end that opens into a face referred to as the "front face" of the clip. The grooves are configured to insert the clip by its front face onto the two joined flat elements and are each delimited on the side walls by a contour having an upper segment and a lower segment opposite the upper segment.

According to the present disclosure, the side walls each have, on their respective outwardly facing faces, a flat holding flange that extends along a rectilinear portion of the lower segment of the groove and providing a contact surface with one of the flat elements.

When forces are applied to the assembly tending, in particular, to move the two flat elements apart from one another, the forces transmitted to the clip are distributed over the entire extent of the contact surfaces of the holding flanges. These forces and the timing of these forces are controlled and absorbed by the rear part of the clip.

According to other advantageous and non-limiting features of the present disclosure, taken alone or in any technically feasible combination:
 the contact surfaces of the holding flanges are perpendicular to the side walls;
 at least one of the lower segments defines a reinforcing hook, the apex of which is flush with the plane passing through the contact surfaces of the holding flanges;
 at least one of the lower segments defines a locking hook that projects into the groove, the locking hook being intended to engage in an opening provided in the flat element in contact with the holding flanges;
 the locking hook is arranged at the open end of the groove;
 the contour of the grooves is notched at the open ends of the grooves in order to facilitate insertion of the clip;
 at least one of the side walls has a reinforcing boss arranged between the groove and a face referred to as the "rear face" of the clip;
 the walls are made of a strip of metal bent at right angles;
 the ends of the metal strip each have at least one bend defining at least two flat end surfaces, the two flat end surfaces being in abutment;
 at least one of the flat end surfaces has at least one blocking tab for blocking any sliding of these surfaces against one another;
 the upper wall is provided with a claw that is configured to apply pressure to the two flat elements when the elements are inserted in the grooves.

According to another aspect, the object of the present disclosure proposes an assembly comprising a clip as previously described, a first flat element and a second flat element that are arranged and held joined together at their main face in the grooves in the clip. The second flat element is provided with at least one opening that accommodates the locking hook of the clip.

Advantageously, the second flat element has a thickness, and the locking hook is contained in the thickness of the second flat element.

BRIEF DESCRIPTION OF THE DRAWINGS

Other features and advantages of the present disclosure will become apparent from the following detailed description of the present disclosure, which is provided with reference to the accompanying figures, in which.

DETAILED DESCRIPTION

Figure 1A:
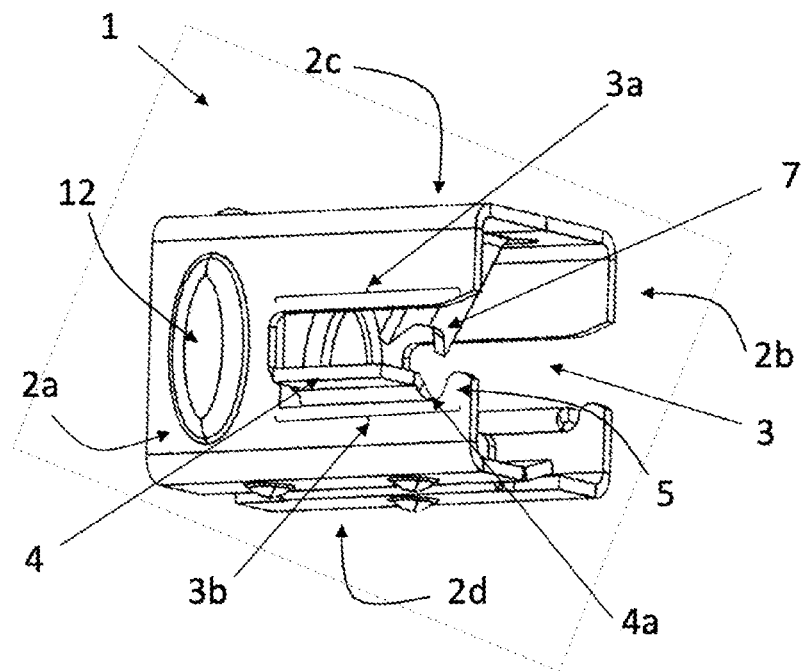
FIGS. 1a and 1b show views of clips according to the present disclosure.
Figure 1B:
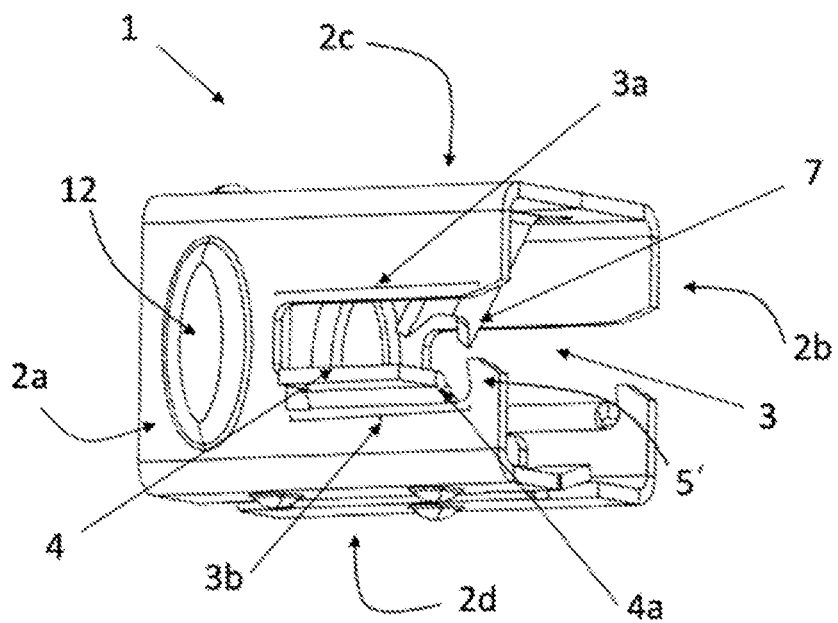
Figure 1C:
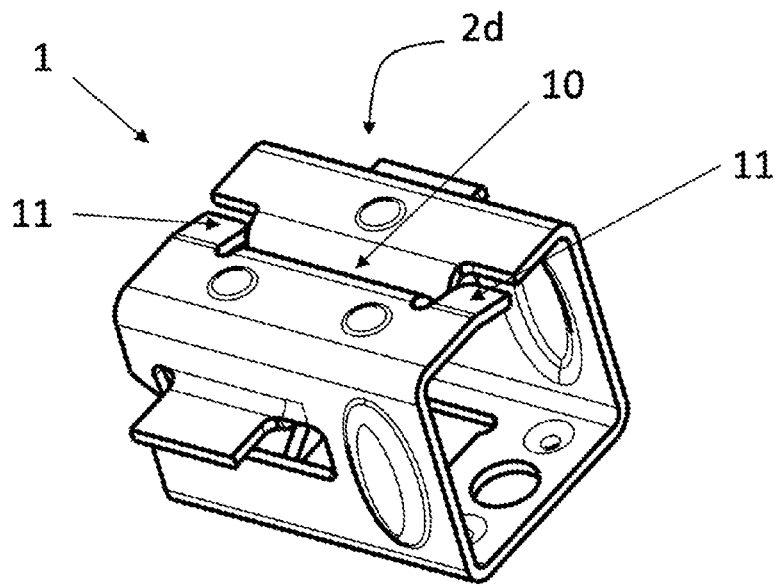
FIG. 1c shows the clip of FIG. 1b showing an underside of this clip.
Figure 2:
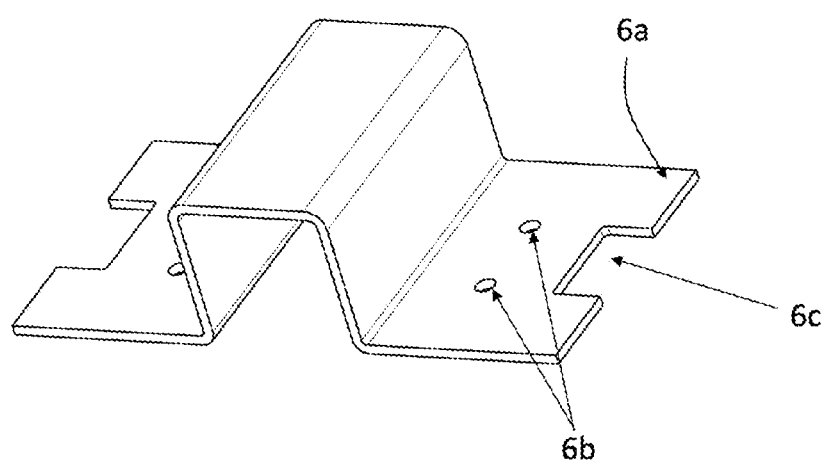
FIG. 2 shows a flat element configured to be held by a clip according to one embodiment of the present disclosure.

Referring to FIGS. 1a, 1b, clips according to the different embodiments of the present description are formed of two side walls 2a, 2b, an upper wall 2c and a lower wall 2d. The four walls are interconnected and define a straight block, that is to say, a closed volume (on at least 4 of its faces) of rectangular or square section.

As was presented in the introduction to this application, the clip 1 is obtained by cutting and bending a metal strip at right angles to define the four walls 2a, 2b, 2c, 2d. The ends of the metal strip meet on the side of the lower wall 2d and have complementary profiles that, when the metal strip has been bent to form the clip 1, can interlock with one another.

The two ends of the metal strip can thus each have a bend defining two flat end surfaces 10. The two flat end surfaces 10 abut against each other when the metal strip has been bent to form the clip 1. One of the ends may have at least one blocking tab 11, in order to block any sliding of one flat end surface 10 against the other.

The metal strip, the patterns at its ends, the grooves, the tabs, the bosses and any other cutouts or deformation of the clip 1 that are the subject of the remainder of this description can be formed before the bending of the metal strip, for example, by cutting-stamping techniques. For the sake of completeness, the manufacture of the clip can also comprise heat or wet treatments.

Continuing the description of FIGS. 1a, 1b, the side walls 2a, 2b of a clip 1 are each provided with a groove 3 having one end opening onto a so-called "front" face of the clip 1. The clip 1 also has a rear face, opposite its front face. The clip 1 can have a length, that is to say, the distance separating its front face from its rear face, between 20 and 40 mm; a height, that is to say, the distance separating the upper wall 2c from the lower wall 2d, between 15 and 30 mm; and a width, that is to say, the distance separating the two side walls 2a, 2b, between 15 and 30 mm.

Preferably, the grooves 3 are arranged on the walls facing each other, and more generally they are located in a plane parallel to the lower and upper walls of the clip 1. The grooves 3 are configured to make it possible to introduce the clip 1, by its front face, on two flat elements joined to one another by their main faces in order to hold them against each other. The height of the grooves 3 therefore corresponds substantially to the thickness of the assembly formed from these two flat elements. Thus, when this assembly thickness is between 2 and 5 mm, a clip can be chosen comprising grooves having a height of 5 mm, or even a little less (for example, 4.9 mm), knowing that in this extreme case the insertion of the clip may require a sustained insertion force, for example, using a hammer. The groove may have a depth, from its bottom to its end opening onto the front face, of between 15 and 25 mm.

To facilitate the insertion of the flat elements, the contour of the grooves may have a notched through-opening end, as is the case with the clips shown in FIGS. 1a, 1b.

The grooves 3 are delimited on the side walls by a groove contour, this contour being composed of a lower segment 3b and an upper segment 3a facing the lower segment 3b. These segments 3a, 3b extend on the one hand to the emerging end of the groove 3, and on the other hand to the bottom of the groove where these segments 3a, 3b meet. By convention, the lower segment 3b corresponds to the portion of the contour of the groove arranged on the side of the lower wall 2d of the clip opposite the groove 3, and the upper segment 3a corresponds to the portion of the contour of the groove 3 arranged on the side of the upper wall 2c opposite the groove 3.

The rear part of the clip, that is to say, the part of the side walls 2a, 2b arranged between the bottom of the groove 3 and the rear face of the clip 1, constitutes a reinforcing part absorbing the forces, and the moments of these forces, exerted on the clip 1 by the flat elements when these are inserted into the grooves 3, and when they are themselves subjected to forces, in particular, those tending to separate them from one another. The rear part may have a dimension, between the bottom of the groove and the rear face of the clip 1, typically between 5 and 15 mm.

In a clip 1 according to the illustrated embodiments, the side walls 2a, 2b each have, on their respective outwardly facing faces, a flat holding flange 4 that extends along a rectilinear portion of the lower segment 3b of the groove 3 and provides a contact surface with one of the flat elements.

When the clip 1 is engaged on the two flat elements joined together, one of the flat elements rests on the contact surfaces of the holding flanges 4. When forces are applied to the assembly tending, in particular, to move the two flat elements apart from one another, the forces transmitted to the clip 1 are distributed over the entire extent of the contact surfaces of the holding flanges 4. These forces and the timing of these forces are controlled and absorbed by the rear part of the clip 1.

In a clip according to the state of the art, the forces transmitted to the clip 1 are applied to the sides of the contours of the grooves, these sides being of very small dimensions, much less than a millimeter. The moment of the forces is very poorly controlled, in particular, when at least one of these flat elements is deformed in bending or in torsion. This poorly controlled moment can comprise a significant torsional component, which is imperfectly absorbed by the rear part of this clip in accordance with the state of the art; this can lead to its deformation by sliding of the end bends closing the metal strip on the side of the lower wall of the clip, and despite the presence of the blocking tab, as was presented in the introduction of this application.

To make a clip 1 even stronger according to the various embodiments shown in FIGS. 1a, 1b, the rear part may have a boss 12 resulting in stiffening it, in particular, with respect to shear forces and residual moments of torsion to which the clip 1 could be subjected.

Like the other parts of the clip 1, the holding flanges 4 are obtained by bending a portion of the metal strip forming the side walls 2a, 2b. The apex of this bend constitutes the rectilinear portion of the lower segment 3b of the contour of the groove 3.

Advantageously, these bends are made so that the contact surfaces of the holding flanges 4 are respectively perpendicular to the side walls 2a, 2b. This ensures that they come into extensive contact with the main surface of one of the flat elements.

Also advantageously, to preserve all the rigidity of the clip 1, the holding flanges 4 do not extend over the entire depth of the grooves 3, and, in particular, up to the emerging end of these grooves 3. Provision is thus made to form a cutout 4a making it possible to bend back only a portion of the metal strip to form a holding flange 4 while preserving, on the side of the emerging end, a hook 5, 5' that is not bent back and is therefore arranged in the plane of the side wall 2a, 2b.

In the embodiment of FIG. 1a, the clip 1 is said to be "non-locking" and the lower segment 3b of the contour of each groove 3, at its emerging end, defines a reinforcing hook 5, the apex of which is flush with the plane passing through the contact surfaces of the holding flanges 4.

In the embodiment of FIG. 1b, the clip 1 is said to be "lockable." In this case, at least one of the lower segments 3b defines a locking hook 5', that is to say, a hook projecting in the groove, which therefore intersects the plane passing through the contact surfaces of the holding flanges. This projecting portion may be of reduced size, for example, on the order of a millimeter above the plane passing through the contact surfaces, so as not to prevent the insertion of the clip on the flat elements. The locking hook 5', here arranged at the emerging end of the groove, is intended to engage in an opening 6b of the flat element that is intended to rest on the holding flanges 4. Such a flat element is shown by way of illustration in FIG. 3. This flat element 6a has a thickness, and the locking hook is contained in the thickness of the second flat element 6a when the clip is engaged on the two flat elements to retain them to one another. Note that the locking hook 5' position at the free end of the lower segment 3b and the fact that the opening 6b integrally accommodates this locking hook 5' reduce the risks of disassembly of the clip 1 from the flat elements, for example, by sliding the clip 1. It is also noted that the flat element 6a can comprise a notch 6c allowing the clip 1 to penetrate more deeply on this element.

According to a very advantageous embodiment, the upper wall 2c of the clip 1 (independent of whether the latter is lockable) is provided with a claw 7 that is configured to apply pressure to the two flat elements when the elements are inserted in the grooves 3. This claw 7, formed by cutting and bending the metal strip during the manufacture of the clip 1, is oriented toward the rear face of the clip 1 so as not to interfere with its insertion. It is particularly useful when the thickness of the two flat elements is less than the height of the grooves, to help keep the two flat elements against each other.

When the flat elements are metallic, it is advantageous to choose the metal constituting the clip 1 so that it has a higher hardness than that of the metal of the flat elements. It can be a steel or a stainless steel. The scratch which then forms on at least one of the flat elements during the insertion of the clip 1 contributes to keeping the clip 1 in position and to establishing a quality electrical contact. This scratch is favored by the sharp-angled end of the claw 7, and, in particular, makes it possible to penetrate through any protective layers with which the scratched flat element may be coated. Electrical contact is also ensured between the clip and the other flat element, in particular, by the flat contact taking place at the holding flanges 4 between these two elements. Note that the claw 7 makes it possible to put this flat contact under slight pressure, which also promotes electrical contact. The clip 1 therefore ensures good quality electrical continuity between the two flat elements, which may be less than 0.1 Ohm, and this electrical continuity can be used to propagate a common ground to all the metallic elements in contact.

Figure 3A:
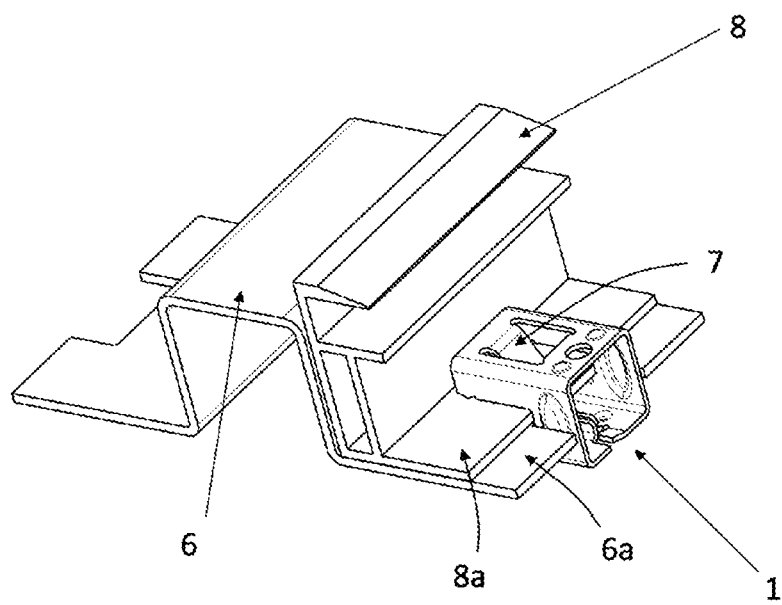
FIGS. 3a and 3b show an assembly implementing a clip according to the present disclosure from two different viewing angles.
Figure 3B:
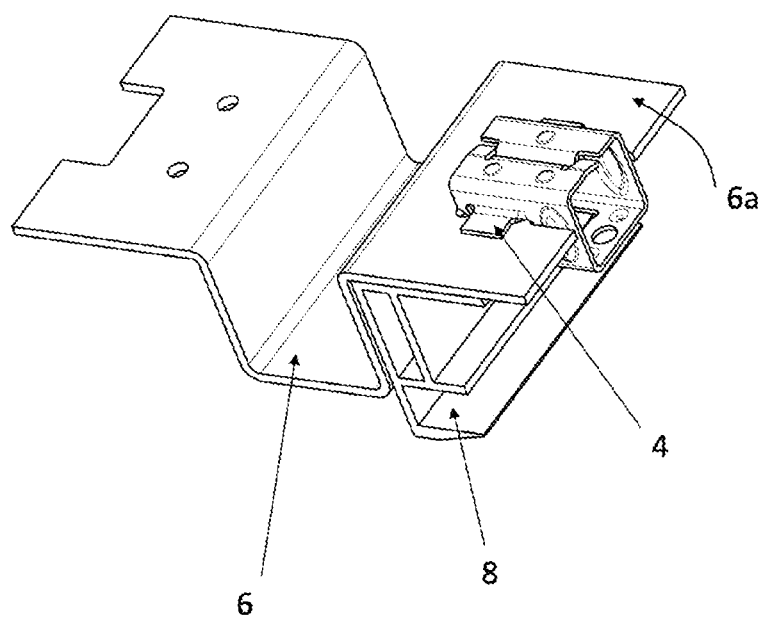

FIGS. 3a and 3b show, from two different viewing angles, an example of the use of a clip 1 according to the present disclosure. In these figures, a photovoltaic panel frame 8 is placed on a rail 6 of a supporting frame. The frame 8 comprises a portion 8a forming a first flat element that rests on a second flat element 6a of the rail 6. The clip is inserted on the two flat elements, and the lower flat element 6a, in contact with the lower segment 3b of the groove, rests on the holding flanges 4.

When the clip 1 is lockable, as is the case with the clip shown in these FIGS. 3a, 3b, at least one opening 6b is provided in the lower flat element, here the portion of the rail 6, to allow the locking hooks 5' to be accommodated. The rail can therefore be provided with a plurality of such openings 6b, distributed along its length, to enable a plurality of clips to be fixed therein in engagement with the frame of the panel.

As will be readily understood, the present disclosure is not limited to the described embodiment, and it is possible to add variants thereto without departing from the scope of the present disclosure as defined by the claims.

What is claimed is:

1. A clip for holding two flat elements joined together at their main face, the clip comprising:
    a lower wall,
    an upper wall, and
    two side walls, the lower wall, upper wall, and two side walls being interconnected so as to define a closed volume, the two side walls each including a groove having an end that opens into a front face of the clip, each of the grooves being configured to insert the clip by its front face onto the two joined flat elements, each of the grooves being delimited on the side walls by a contour having an upper segment and a lower segment opposite the upper segment, the two side walls each having, on their respective outwardly facing faces, a flat holding flange extending along a rectilinear portion of the lower segment of the groove and providing a contact surface with one of the flat elements.

2. The clip of claim 1, wherein the contact surfaces of the holding flanges are perpendicular to the side walls.

3. The clip of claim 1, wherein at least one of the lower segments defines a reinforcing hook, an apex of the reinforcing hooks being flush with a plane passing through contact surfaces of the holding flanges.

4. The clip of claim 1, wherein at least one of the lower segments defines a locking hook that projects into the groove, the locking hook being configured to engage in an opening provided in a flat element in contact with the holding flanges.

5. The clip of claim 4, wherein the locking hook is located at the open end of the groove.

6. An assembly, comprising:
a clip according to claim 4,
a first flat element, and
a second flat element, the first flat element and the second flat element arranged and held joined together at main faces thereof in the grooves in the clip, the second flat element being provided with at least one opening that accommodates the locking hook of the clip.

7. The assembly of claim 6, wherein the second flat element has a thickness, and the locking hook is contained in the thickness of the second flat element.

8. The clip of claim 1, wherein the contour of the grooves is notched at the open ends of the grooves to facilitate insertion of the clip.

9. The clip of claim 1, wherein at least one of the side walls has a reinforcing boss arranged between the groove and a face referred to as the "rear face" of the clip.

10. The clip of claim 1, wherein the walls comprise a metal strip bent at right angles.

11. The clip of claim 10, wherein ends of the metal strip have at least one bend defining at least two flat end surfaces, the at least two flat end surfaces being in abutment.

12. The clip of claim 11, wherein at least one of the at least two flat end surfaces has at least one blocking tab for blocking sliding of the at least two flat end surfaces against one another.

13. The clip of claim 1, wherein the upper wall has a claw configured to apply pressure to the two flat elements when the two flat elements are inserted in the grooves.

\* \* \* \* \*